(12) United States Patent
Lippert

(10) Patent No.: US 6,572,021 B1
(45) Date of Patent: Jun. 3, 2003

(54) CARD-SHAPED DATA CARRIER AND METHOD FOR PRODUCING THE SAME

(75) Inventor: Johannes Lippert, Wolfgang (AT)

(73) Assignee: Skidata AG, Gartenau (AT)

( * ) Notice: Subject to any disclaimer, the term of this patent is extended or adjusted under 35 U.S.C. 154(b) by 0 days.

(21) Appl. No.: 09/786,448

(22) PCT Filed: Jun. 24, 1999

(86) PCT No.: PCT/EP99/04413
§ 371 (c)(1),
(2), (4) Date: Mar. 1, 2001

(87) PCT Pub. No.: WO00/16256
PCT Pub. Date: Mar. 23, 2000

(30) Foreign Application Priority Data

Sep. 10, 1998 (DE) .......................................... 198 41 431
Nov. 10, 1998 (DE) .......................................... 198 51 836

(51) Int. Cl.⁷ ........................ G06K 13/30; G06K 13/077
(52) U.S. Cl. ........................ 235/481; 235/385; 235/492; 235/493; 235/468; 235/488; 369/283; 369/383
(58) Field of Search .............................. 235/481, 492, 235/493, 385, 426; 369/283, 383, 468; 428/488

(56) References Cited

U.S. PATENT DOCUMENTS

| | | | | | |
|---|---|---|---|---|---|
| 4,507,346 A | * | 3/1985 | Maurer et al. | .............. | 235/488 |
| 4,544,181 A | * | 10/1985 | Maurer et al. | ................ | 283/74 |
| 4,709,254 A | * | 11/1987 | Haghiri-Tehrani et al. | .. | 257/679 |
| 5,262,374 A | * | 11/1993 | Okabe et al. | ................ | 347/264 |
| 5,310,611 A | * | 5/1994 | Okabe et al. | ............. | 346/135.1 |
| 5,321,239 A | * | 6/1994 | Masubuchi et al. | ......... | 235/380 |
| 5,379,058 A | * | 1/1995 | Obu et al. | ................ | 346/135.1 |
| 5,424,764 A | * | 6/1995 | Yamaguchi et al. | ..... | 346/135.1 |
| 5,443,807 A | * | 8/1995 | Tang et al. | ................. | 208/113 |
| 5,448,284 A | * | 9/1995 | Matsuda et al. | .......... | 346/135.1 |
| 5,471,044 A | * | 11/1995 | Hotta et al. | .................. | 235/380 |
| 5,537,138 A | * | 7/1996 | Yamada et al. | .............. | 347/171 |
| 5,573,996 A | * | 11/1996 | Inoue | ......................... | 428/195 |
| 5,583,554 A | * | 12/1996 | Masubuchi et al. | ......... | 347/171 |
| 5,640,306 A | * | 6/1997 | Gaumet et al. | ............. | 174/52.1 |
| 5,643,851 A | * | 7/1997 | Konagaya et al. | .......... | 503/201 |
| 5,700,746 A | * | 12/1997 | Kutami et al. | .............. | 503/206 |
| 5,719,850 A | * | 2/1998 | Yoshioka et al. | ........... | 369/283 |
| 5,804,026 A | * | 9/1998 | Vogt | ........................... | 156/295 |
| 5,825,393 A | * | 10/1998 | Kocznar et al. | ............. | 347/171 |
| 5,880,445 A | * | 3/1999 | Mori et al. | ................... | 235/380 |
| 5,896,159 A | * | 4/1999 | Masubuchi et al. | ......... | 347/191 |
| 5,914,482 A | * | 6/1999 | Kocznar | ....................... | 235/487 |
| 5,916,841 A | * | 6/1999 | Amano et al. | ............... | 427/152 |
| 5,948,727 A | * | 9/1999 | Hotta et al. | .................. | 427/152 |
| 5,978,348 A | * | 11/1999 | Tamura | ..................... | 369/275.1 |
| 5,985,077 A | * | 11/1999 | Konagaya et al. | .......... | 156/235 |
| 6,010,808 A | * | 1/2000 | Naito et al. | .................. | 430/138 |
| 6,036,099 A | * | 3/2000 | Leighton | ..................... | 156/154 |
| 6,111,506 A | * | 8/2000 | Yap et al. | .................... | 340/5.86 |
| 6,152,620 A | * | 11/2000 | Ozawa et al. | ............... | 101/483 |
| 6,154,243 A | * | 11/2000 | Tatewaki et al. | ............ | 347/185 |
| 6,177,383 B1 | * | 1/2001 | Amano et al. | ............... | 503/201 |
| 6,375,784 B1 | * | 4/2002 | Ohsawa et al. | .............. | 156/235 |

FOREIGN PATENT DOCUMENTS

JP 11-58986 A1 * 3/1999 ............ B41M/5/36

OTHER PUBLICATIONS

"Ricoh Aims New Cards at Loyality Market", *Card Technology Today*, Jul./Aug. 1996, p. 6.
Thermochromic Card, *Card Forum International*, 1996, pp. 55–56.

* cited by examiner

Primary Examiner—Michael G. Lee
Assistant Examiner—Daniel Walsh
(74) Attorney, Agent, or Firm—Flynn, Thiel, Boutell & Tanis, P.C.

(57) ABSTRACT

The invention relates to a card-shaped data carrier having a printed layer (6) on a carrier layer (2) and a transparent film (1) with a thermoreversible color layer (4) on said printed layer (6).

14 Claims, 1 Drawing Sheet

CARD-SHAPED DATA CARRIER AND METHOD FOR PRODUCING THE SAME

FIELD OF THE INVENTION

This invention relates to a card-shaped data carrier with a thermoreversible layer.

BACKGROUND OF THE INVENTION

Identification and authorization cards which are increasingly used are smart cards permitting the card owner to utilize a great variety of services, e.g. means of transport such as ski lifts, means of local transport, rental cars, sports facilities, car parks, public telephones, etc. The chip usually stores a credit balance to which a corresponding amount is debited with a read-write device upon utilization of the service, for example upon entry. In order to make the available card balance visible anytime, it is known to provide a partial area of the card with a thermoreversible layer on which a thermal printhead connected to the read-write device records the particular card balance. The data recorded on the thermoreversible layer with the thermal printhead are opaque, or transparent if the layer is opaque. In order to make them more visible the thermoreversible layer is applied to a background layer which is dark or has metallic luster (compare e.g. EP-A-0 405 054 and WO 96/11451).

Further, there is an authorization card on the market which has a thermoreversible color layer on a white carrier film and a protective layer on the thermoreversible color layer. The thermoreversible layer of the known authorization card is writable with the thermal printhead in visible color, e.g. blue.

Identification and authorization cards have in addition permanent data pictures, for example the logo of the card issuer, advertising and the like. For this purpose, a printed layer covering the greatest part of the card except for a field for thermoreversible recording is applied to the thermoreversible layer or its protective layer in the known authorization card.

U.S. Pat. No. 5,719,850 discloses a card-shaped optical storage medium which has an optical layer for recording and reading data and a printed layer under the optical layer. In the printed layer, a partial area is formed as a thermoreversible layer in order to render for example the remaining storage capacity of the optical layer visible. The thermoreversible field is written with a light beam through the optical layer.

Smart cards are being used more and more as multifunctional cards. That is, one card should permit a plurality of different entitlements. For example, one and the same authorization card can be designed as an annual ski pass for one ski area and a point ticket for other ski areas, or as a point ticket for a ski area and a point ticket for an indoor swimming pool, and at the same time as a time-limited authorization card for a means of local transport. In order to permit the particular credit balances, different periods of validity and the like to be recorded visibly on the thermoreversible layer for the individual entitlements of such a multifunctional card, an accordingly large area must be provided on the card.

SUMMARY OF THE INVENTION

The object of the invention is therefore to provide a card-shaped data carrier, in particular an identification and/or authorization card, with a thermoreversible layer which has a large-area thermoreversible recording of a large amount of data and/or pictures without the need to reduce the area for the permanent data and pictures of the card or to enlarge the card.

The card-shaped data carrier of this invention has a carrier layer to which a printed layer is applied, preferably all-over. A thermoreversible layer, which is formed as a transparent film, is applied preferably all-over to the printed layer.

The carrier layer may consist of a thermoplastic resin as is customarily used for plastic cards, e.g. PET (polyethylene terephthalate) or PVC (polyvinyl chloride), polyethylene or the like.

The printed layer, which is applied to the carrier layer for example by screen printing or another printing process, bears the permanent (nonerasable) data and pictures of the card. These may involve e.g. the logo of the card issuer, advertising or, in a ski card, a general map of the particular ski area. Since the total card surface is available if necessary, the card may be provided with a maximum of such permanently applied information.

The thermoreversible layer is provided with the erasable data and pictures. The thermoreversible layer of the inventive data carrier, which is formed as a transparent film, preferably consists of a transparent carrier film with a thermoreversible color layer applied thereto and a protective layer applied to the thermoreversible color layer. The transparent film forming the thermoreversible layer thus has a structure which, apart from the printed layer, corresponds substantially to the structure of the authorization card described at the outset, except that the carrier film is of transparent design while it is white in the authorization card described at the outset.

The transparent thermoreversible film may have e.g. a thickness of 10 to 50 microns, and the carrier film of the transparent thermoreversible film may be e.g. a PET film. The visible, non-white, color of the thermoreversible color layer which arises during recording with the thermal printhead may be a blue color, as in the known authorization card described at the outset.

Writing in visible color and erasing the data and/or pictures on the thermoreversible film may be effected in different ways. Thus, the thermoreversible film or layer may be writable with data and/or pictures in visible color with the thermal head at a first temperature, said data and/or pictures being erased through transition to a transparent state at a second higher temperature. The first temperature, i.e. the temperature at which the thermoreversible color layer changes from transparent to visible or blue, may be for example 70 to 90° as in the known authorization card described, while the second temperature at which the visible or blue color changes back to the transparent state for erasing the recorded data and pictures may be for example 100 to 130° C. While recording on the thermoreversible layer is effected with the thermal printhead, an erase bar or roller may be provided for erasure.

However, it is not necessary that two temperatures be applied, one for writing visible color and a second higher temperature for erasure. Rather, one can use the same temperature for writing and erasing, exploiting different cooling times, i.e. fast cooling for writing and slow cooling for erasing. That is, if the thermoreversible layer is cooled quickly, visible color occurs at the place heated with the thermal printhead, while the thermoreversible layer passes to a transparent state upon slow cooling after heating with the thermal printhead.

The inventive data carrier may be provided on one or both sides with a carrier layer with a printed layer and a transparent thermoreversible film applied to the printed layer.

The data and pictures recorded on the thermoreversible layer may be e.g. the name of the card owner or similar personalization data, a photo of the card owner, the period of validity of the card, data about points or another kind of credit balance or the like.

The permanent data and pictures borne by the printed layer of the inventive data carrier and the data and pictures recorded on the thermoreversible layer may be coordinated with each other such that in the area of the data and pictures recorded on the thermoreversible layer with the thermal printhead the printed layer forms a background contrasting therewith. This can be effected for example by lightening the printed layer in the area where data and pictures are recorded on the thermoreversible layer, e.g. in the area of the printed layer where the photo of the card owner is recorded on the thermoreversible layer.

The printed layer may in addition be provided in the area of the thermoreversibly recorded data and pictures with security features, for example color patterns or effects, UV-reflecting characters, holograms and the like, as are used for forgery-proofness in bank notes and papers of value in order to render unauthorized manipulation on the transparent, thermoreversible film visible.

The transparent thermoreversible film of the inventive data carrier at the same time forms excellent mechanical, thermal and chemical protection of the printed layer and protection from UV radiation.

The inventive data carrier is preferably provided with a chip and/or a magnetic stripe on which the data recorded on the thermoreversible layer and further data are stored. The chip has a nonvolatile, rewritable memory. The data carrier may have a contact-type and/or a contactless-type chip, for example a contactless chip for means of transport, such as ski lifts or local trains, and a contact-type chip, for example for access entitlement to a hotel room. The authorization card may be a check card, credit card or telephone card or an access entitlement card. The entitlement may be a personal entitlement, event-dependent and/or value-dependent. It may also be an identity card or driver's license e.g. with a limited period of validity. This permits e.g. a change of address to be recorded on the thermoreversible layer without any need to produce a new card.

BRIEF DESCRIPTION OF THE DRAWINGS

In the following an embodiment of the inventive data carrier will be explained more closely by way of example with reference to the drawing, in which.

DETAILED DESCRIPTION

Figure 2:
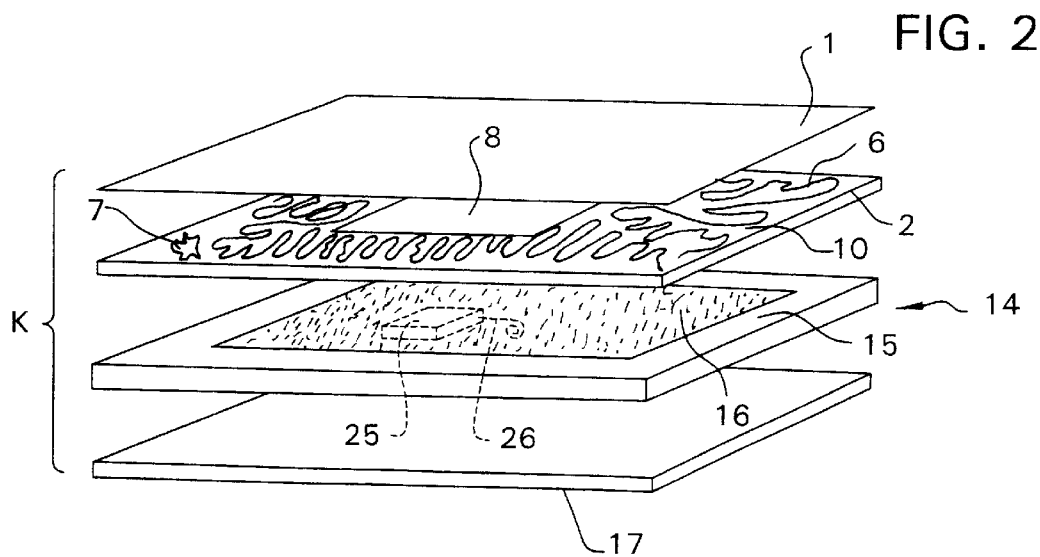

According to FIG. 2, the data carrier consists of card K made of transparent, thermoreversible film 1 which is applied to carrier or cover layer 2.

Figure 3:
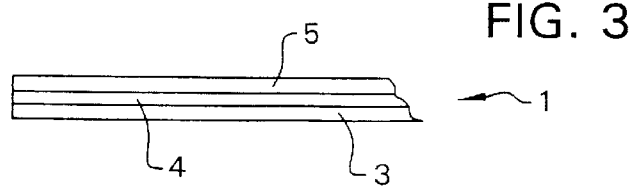
FIG. 3 shows a cross section through the transparent thermoreversible film.

Transparent, thermoreversible film 1 consists according to FIG. 3 of transparent carrier film 3, e.g. of PET, thermoreversible color layer 4 and protective layer 5.

Cover layer 2 consisting e.g. of PET is provided on its side facing thermoreversible film 1 with printed layer 6 which may be applied for example by screen printing, e.g. with logo 7 of the card issuer, printed layer 6 having according to FIG. 2 for example logo 7 of the card issuer, lightened area 8 and further light area 10 provided with security pattern 9.

Figure 1:
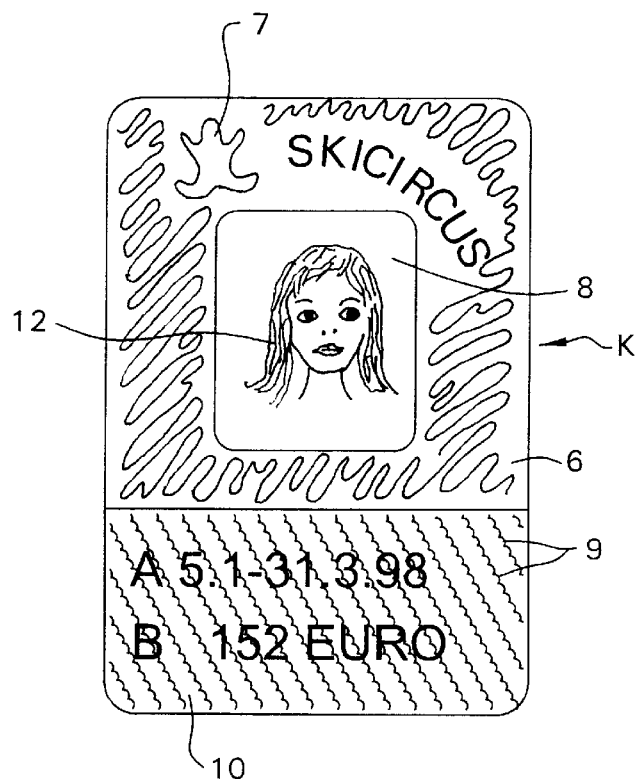
FIGS. 1 and 2, respectively, show top and exploded views of the data carrier.

According to FIG. 1, photo 12 of the card owner is recorded on thermoreversible film 1 with a thermal printhead in lightened area 8 of printed layer 6, and for example the period of validity of the card in ski area A and the credit balance in cafeteria B in area 10 of printed layer 6.

Card K is designed as a contactless smart card. For this purpose, inside layer 14 is provided according to FIG. 2 with frame 15 in which a chip module 25 with an antenna coil 26 is embedded in plastic material 16 (chip module and antenna shown in phantom). Further cover layer 17 ends off card K on the other side. The other cover layer 17 may likewise be provided with a printed layer. It may also have a further thermoreversible transparent film on said printed layer.

For producing the card according to FIG. 2, carrier or cover layer 2 is provided with printed layer 6 in a first step. Then thermoreversible transparent film 1 is hot-laminated on carrier or cover layer 2 provided with printed layer 6. Similarly, cover or carrier layer 17 may be provided with a printed layer and subsequently with a thermoreversible transparent film by hot lamination. Carrier or cover layers 2 and 17 with laminated thermoreversible film or films 1 are then connected with inside layer 14 by cold lamination, i.e. by accordingly forming material 16 of inside layer 14 as an adhesive compound.

The printed layer may be applied, not to carrier layer 2, but to the lower side of the thermoreversible transparent film, which is then laminated to the bare carrier layer.

A further film including the security features, e.g. a hologram, may also be laminated between the thermoreversible transparent film and the carrier layer.

What is claimed is:

1. A card-shaped data carrier comprising:
   a support frame, said support frame having two opposed sides;
   a cover layer disposed over a first side of said support frame, said cover layer having an inner side that is completely bonded to the first side of said support frame over which said cover layer is disposed and an outer side opposite the inner side;
   a thermoreversible film disposed over the outer side of said cover layer, said thermoreversible film comprising:
     a carrier film formed of transparent material that has an inner surface bonded directly to said cover layer so that the whole of the inner side of said carrier film abuts said cover layer and an outer surface opposite said cover layer;
     a thermoreversible color layer bonded directly to the outer surface of said carrier film, wherein said thermoreversible color layer is formed of transparent material on which non-white color images form and fade upon the selective application of heat; and
     a protective layer disposed over said thermoreversible color layer; and
   a printed layer applied to the outer side of said cover layer or the inner surface of said carrier film, said printed layer defining at least one visually detectable image;
   wherein, images are selectively formed on said thermoreversible color layer and by said printed layer so that at least one image formed by said printed layer is visually detectable through a transparent section of said thermoreversible color layer.

2. The data carrier of claim 1, wherein said printed layer is applied to the outer side of said cover layer.

3. The data carrier of claim 2, wherein said thermoreversible film is disposed over said cover layer to completely cover said printed layer.

4. The data carrier of claim 1, wherein said thermoreversible color layer is formed from material on which images form when said thermoreversible color layer is heated to a first temperature and on which the images fade when said thermoreversible color layer is heated to a second temperature, the second temperature being higher than the first temperature.

5. The data carrier of claim 1, wherein said thermoreversible color layer is formed from a material on which images are formed when said thermoreversible color layer is heated to a select temperature and then cooled at a first rate and on which images fade when said thermoreversible color layer is heated to the select temperature and then cooled at a second rate, the second rate being slower than the first rate.

6. The data carrier of claim 1, wherein said printed layer is formed with images that are located below said thermoreversible color layer that contrast with images formed on said thermoreversible color layer.

7. The data carrier of claim 1, wherein said printed layer is formed to define at least one image that is a security feature and said printed layer and said thermoreversible color layer are selectively formed so that the printed layer security feature is visible through a transparent section of said thermoreversible color layer.

8. The data carrier of claim 1, wherein said thermoreversible color layer is formed so that at least one image formed by said thermoreversible color layer is a security feature.

9. The data carrier of claim 1, wherein said printed layer is applied to said inner surface of said carrier film.

10. A method of manufacturing a data carrier comprising the steps of:

forming a thermoreversible film, the thermoreversible film comprising: a carrier film formed of transparent material; a thermoreversible color layer bonded completely over said carrier film, said thermoreversible color layer comprising a layer of transparent material on which non-white color images form and fade upon the selective application of heat; and a protective layer bonded completely over said thermoreversible color layer so that said thermoreversible color layer is disposed between the carrier film and the protective layer and the carrier film has an exposed surface opposite the thermoreversible color layer;

hot laminating the thermoreversible film to a first cover layer sothat the whole of the exposed surface of the carrier film is bonded directly to the first cover layer; and securing a side of the first cover layer opposite the side to which the carrier film is bonded to a first side of a support frame wherein, prior to said hot laminating the thermoreversible film to the cover layer, printing is applied to the side of the first cover layer to which the thermoreversible film is bonded or to the exposed surface of said carrier film so that said printing forms an image that is visible through the thermoreversible film.

11. The method of manufacturing a data carrier of claim 10, wherein:

a chip module and an antenna are located in said support frame; and a second cover layer is secured over a second side of the support frame, the second side of the support frame being opposite the first side.

12. The method of manufacturing a data carrier of claim 11, wherein:

the chip module and the antenna are embedded in the support frame with a plastic material; and the cover layers are secured to the support frame by cold laminating the cover layers to the plastic material.

13. The method of manufacturing a data carrier of claim 10, wherein said printing is applied to the first cover layer.

14. The method of manufacturing a data carrier of claim 10, wherein said printing is applied to the exposed surface of the carrier film.

* * * * *